(12) United States Patent
Mok et al.

(10) Patent No.: US 6,357,779 B1
(45) Date of Patent: Mar. 19, 2002

(54) HITCH ASSEMBLIES FOR CONNECTING A TRAILER TO A TOW VEHICLE

(75) Inventors: Chiu Hang Mok, Flat C, 16/F, Shun Tai Building, 129 First, Hong Kong; Chiu Nang Mok, Wanchai, both of (HK)

(73) Assignee: Chiu Hang Mok (HK)

( * ) Notice: Subject to any disclaimer, the term of this patent is extended or adjusted under 35 U.S.C. 154(b) by 0 days.

(21) Appl. No.: 09/561,699

(22) Filed: May 1, 2000

(51) Int. Cl.[7] ................................................ B60D 1/40
(52) U.S. Cl. ................ 280/478.1; 280/477; 280/479.1; 280/479.3; 280/462
(58) Field of Search .............................. 280/477, 478.1, 280/479.2, 479.3, 482, 490.1, 491.1, 492.2, 499, 492, 493, 494, 456.1, 462

(56) References Cited

U.S. PATENT DOCUMENTS

| | | | |
|---|---|---|---|
| 2,062,788 A | * 12/1936 | Jacob | 280/477 |
| 3,891,237 A | 6/1975 | Allen | 280/477 |
| 3,989,270 A | * 11/1976 | Henderson | 280/478 |
| 4,169,611 A | * 10/1979 | Smith et al. | 280/482 |
| 4,176,854 A | 12/1979 | Hill et al. | 280/478 |
| 4,515,387 A | 5/1985 | Schuck | 280/478 |
| 4,603,878 A | * 8/1986 | Smith, Jr. | 280/478 |
| 4,744,583 A | * 5/1988 | Blackwood | 280/478 B |
| 4,773,667 A | 9/1988 | Elkins | 280/477.8 |
| 4,951,957 A | * 8/1990 | Gullickson | 280/479.2 |
| 4,991,865 A | 2/1991 | Francisco | 280/477 |
| 5,009,446 A | 4/1991 | Davis | 280/479.2 |
| 5,011,176 A | 4/1991 | Eppinette | 280/479.3 |
| 5,277,447 A | 1/1994 | Blaser | 280/479.2 |
| 5,407,221 A | 4/1995 | Haire et al. | 280/476.1 |
| 5,580,088 A | * 12/1996 | Griffith | 280/479.2 |
| 5,593,171 A | 1/1997 | Shields | 280/479.2 |
| 5,630,606 A | 5/1997 | Ryan | 280/479.3 |
| 5,924,716 A | 7/1999 | Burkhart, Sr. et al. | 280/476.1 |

FOREIGN PATENT DOCUMENTS

| | | |
|---|---|---|
| CN | 2109961 | 7/1992 |
| GB | 225 290 | 12/1924 |
| GB | 2 170 769 | 8/1986 |
| GB | 2 186 174 | 8/1987 |
| GB | 2 247 438 | 3/1992 |
| WO | WO86/02894 | 5/1986 |
| WO | WO93/08994 | 5/1993 |

OTHER PUBLICATIONS

International Search Report dated Aug. 30, 2001 corresponding to International Application PCT/CN01/00689.

* cited by examiner

*Primary Examiner*—Brian L. Johnson
*Assistant Examiner*—Daniel Yeagley
(74) *Attorney, Agent, or Firm*—Christie, Parker & Hale, LLP

(57) ABSTRACT

An improvement in or relating to a hitch assembly for connecting a trailer to a towing vehicle. The hitch assembly consists of features which are moveable in a telescopic manner and/or in a rotational manner to allow the adjustable repositioning of a coupling member of a trailer for it to be conveniently connected to a tow ball of a towing vehicle. The hitch assembly consists of ratchet type features that when a movement of the trailer is provided by the towing vehicle, the hitch assembly will move towards a condition, substantially automatically, where the connection between the trailer and the vehicle becomes substantially rigid apart from the degrees of freedom of movement normally provided by the coupling. The ratchet type features can be made in operative to allow for a user to manipulate the position of the tow coupling of the trailer so as to achieve a coupling between the trailer and the tow vehicle without the trailer needing to be in an exact location in respect of the tow coupling of the trailer.

38 Claims, 14 Drawing Sheets

HITCH ASSEMBLIES FOR CONNECTING A TRAILER TO A TOW VEHICLE

FIELD OF INVENTION

The present invention relates to improvements in or relating to hitch assemblies for connecting a trailer to a tow vehicle.

BACKGROUND TO THE INVENTION

Vehicle trailers which may for example include caravans, domestic trailers, commercial trailers, water craft trailers and the like, which are normally connected to a vehicle such as a car or truck are well known. The most common form of coupling that is formed between the vehicle and its trailer is by the provision of a tow ball secured to a vehicle to which a female coupling member secured to the trailer (usually to the tow or draw bar of a trailer) can be secured. The female coupling member usually incorporates a displaceable portion which can be moved to a condition to allow for the female member to fall over the tow ball of the vehicle. The moveable member is then moved to a condition where it will subsequently prevent the female member from being uplifted from the tow ball.

The female member is usually located at the end of a draw bar which is rigidly fixed to the frame or chassis of the trailer. In order for the coupling between the vehicle and the trailer to be made, the tow ball of a vehicle must be placed in the vicinity or below the female member of the trailer.

The female member then needs to be manoeuvred, which normally requires the movement of the entire trailer so that it and the tow ball can be aligned for engagement. Although some trailers provide a jockey wheel on the draw bar to allow for the female member to be raised and lowered, normally there are no provisions to allow for the female coupling to be moved independently of the trailer. Therefore in order to make the coupling the entire trailer may need to be rotated and/or displaced to achieve the alignment.

Although this may not be a difficult task for smaller trailers or trailers where there is no significant loading, for caravans, boat trailers or other trailers where there is a significant resistance to movement, the achievement of a coupling between the trailer and the vehicle can be difficult. In such instances it is virtually essential for the tow ball of a vehicle to be located immediately below the female member of the trailer. An example of a means which allows for an increase in accuracy and simplicity of the placement of a tow ball of a vehicle is described in GB2247438. This patent specification describes a sighting device to assist the coupling of a trailer to a towing vehicle. The use of devices such as this still requires a driver of the vehicle to manoeuvre the tow ball to a position to allow an easy coupling to be achieved.

Devices to allow for a guided engagement of the trailer and the vehicle to be achieved are also known. In for example GB2170769, there is described the use of a coupling for towing vehicles which utilises an intermediate member between the securing means of the trailer with the tow ball of a vehicle. This intermediate member with the use of angled guide portions as part of the trailer allows for a vehicle to be backed towards a trailer and for the intermediate member to be guided to the trailer coupling.

Several patent specifications describe means by which an accurate positioning of the tow ball of a vehicle becomes in-essential.

GB225290 describes indeed an alternative arrangement to simplify the achievement of a coupling between a trailer and a vehicle. In this specification there is described a trailer coupling which by way of a cable connected to the trailer (preferably through the draw bar) can allow the trailer coupling to be positioned onto the tow bar of a vehicle and be subsequently winched by retracting the cable, to move the vehicle and trailer to a more proximate position to then allow the trailer coupling to be locked in place relative to the draw bar.

In U.S. Pat. No. 5277447 there is described a trailer coupling mechanism which consists of a telescopic and articulatable draw bar which allows for simplified alignment between the trailer coupling and its counterpart vehicle coupling.

The device is capable of both an axial and lateral movement and allows for a coupling between the trailer and the vehicle to be achieved as long as both coupling portions are within a region that can be reached by the movement of the device. Therefore it is not essential for a tow ball of a vehicle to be moved accurately as long as it is moved within the range of movement provided by the device.

Once the coupling has been made, the device still requires alignment of the portions to allow a retraction of these telescopic feature to be achieved to create a rigid draw bar arrangement.

It is therefore an object of the present invention to provide improvements in or relating to towing apparatus for trailers which will at least provide the public with a useful choice.

BRIEF DESCRIPTION OF THE INVENTION

Accordingly in a first aspect the present invention consists a telescoping hitch assembly for connecting a trailer to a tow vehicle comprising:

a first member engaged or engagable to a trailer a coupling arm telescopically engaged with said first member, said coupling arm adapted for coupling at or towards a first distal end thereof to said vehicle a ratchet arrangement between said first member and said coupling arm , said arrangement including ratchet surface defining means and at least one movable deployable member engageable with said ratchet surface defining means wherein said moveable deployable member is moveable between an operative condition(ratchet) and an inoperative (non ratchet) condition, and wherein said deployable member, when in its operative condition, prevents displacement between said ratchet surface defining means and said deployable member in a direction of telescopic extension between said first member ands said coupling arm.

Preferably said first member carries said ratchet surface defining means.

Preferably said ratchet surface defining means is located within a cavity of said first member, and wherein said deployable member is moveably located within said cavity.

Preferably said ratchet surface defining means provides at least one ratchet surface of a plurality of reliefs being of a shape to allow engagement of a ratchet kind therewith by said deployable member.

Preferably said surface of said ratchet surface defining means is of an inclined stepped nature.

Preferably said ratchet surface defining means is dependably located from said first member and said deployable member carried by and is pivotally connected to said coupling arm within said cavity to pivot between said operative (ratchet surface defining means engaged) an inoperative conditions.

Preferably said deployable member in operative condition is engaged with a relief of the ratchet surface defining means to prevent telescopic extension but allow retraction of the connection arm to said ratchet surface defining means and in said inoperative condition is pivoted away from being engaged with the ratchet surface defining means to allow axial displacement between said ratchet surface defining means and the coupling arm.

Preferably said first member is a hollow rigid elongate member.

Preferably said ratchet surface defining means is axially (in the telescopic direction) displaceable relative to said first member within inner (in direction of retraction) and outer (in direction of extension) limits.

Preferably said inner and outer limits are defined by end stops of said cavity of said first member.

Preferably said ratchet surface defining means is biased away from at least one of said inner or outer limits by biasing means.

Preferably said ratchet surface defining means is biased away from both said inner and outer limits by biasing means.

Preferably said biasing means are springs.

Alternatively said ratchet surface defining means is fixed relative to said first member.

Preferably said ratchet surface defining means is of a "U" section, having at least one inwardly directed ratchet surface.

Preferably said section provides two opposite and inwardly facing ratchet surfaces.

Preferably there are two deployable members pivotally connected to the coupling arm, each moveable to and from said operative and inoperative conditions in opposite directions.

Preferably said coupling arm is substantially elongate and is adapted at one distal end for coupling to said vehicle by a means engagable to a connection point of a vehicle.

Preferably said means engagable is a female coupling member engagable to a tow ball connection point of a vehicle.

Preferably at the other distal end of said coupling arm is provided the at least one deployable member.

Preferably said telescopic engagement of said first member and coupling arm is such that the coupling arm moves in part in and out and from one end of the first member.

Preferably said at least one deployable member is actuatable between is operative and inoperative conditions by a manually actuable means.

Preferably said manually actuable means is a lever pivotally connected to said coupling arm about an axis normal to the telescopic axis, and actuates a push rod coaxial with said coupling arm between two limits of movement defined by positions in which said at least one deployable member is in its operative and inoperative conditions wherein movement from one limit to the other, positively displaces the at least one deployable member to an inoperative condition.

Preferably said at least one deployable member is biased towards its operative condition by a biasing means.

In a second aspect the present invention consist in a rotatable hitch assembly for connecting a trailer to a tow vehicle comprising:

a base member engaged or engagable to a trailer a second member to or from which a coupling arm adapted to connect to the vehicle extends, said second member rotatably engaged about a vertical axis of rotation with said base member, at least one means to lock, rotatably carried by one of said base or second members and held in a sliding engagement with the other of said base or second member save for at one locking position where the base and second members are in a desired relative angular disposition, wherein said means to lock refrains relative rotation of said base and second members.

Preferably said means to lock acts between two concentrically moving parts of said base and second member.

Preferably said means to lock is carried by said second member and is displaceable thereto to locate at leas in part with a recess of a concentric surface of said base member when in said desired relative angular disposition.

Preferably said means to lock is a lug displaceable in a radially outward direction to said second member when in an aligned condition with said recess.

Preferably said desired angular disposition of said base and second members is when the plane through the axis of rotation in the alignment with the point of connection of said second is parallel to the direction alignment of the wheels of the trailer.

Preferably said concentric surface allows the said lug to rotate there over save for when aligned with said recess.

Preferably a cam plate is provided which is actuably rotatable about said axis of rotation relative to said second member, said cam plate being provided with a camming surface with which a cam follower of said lug acts,where upon rotation of the cam plate relative to the said second member, said lug is thereby moved at least from its locking condition to an unlocking condition.

Preferably said lug is biased to act in a direction to lock.

Preferably said biasing of said lug is by a spring.

Preferably two pawls are provided to act between said base and second member each operative in opposite directions of rotation in preventing rotation of said locking means away from said desired angular disposition.

Preferably said pawls are pivotably rotatable about pivot points to the second member and each extend to locate with an inwardly directed surface of said base member, wherein said surface is provided with reliefs which act with said pawls to prevent rotation of said locking member away from said recess.

Preferably said pawls are pivotably rotatable to the second member and each extend to locate with an inwardly directed surface of said base member, wherein said surface is provided with reliefs, where that pawl to prevent rotation in the direction away from said desired angular disposition is that pawl which extends in that direction of rotation from it pivot point to said second member.

Preferably said cam plate also has cam surfaces for engagement by cam followers of said pawls whereby the pawls can upon the rotation of said cam plate be retracted from said surface of said base member.

Preferably said rotation of said cam plate to move said lug from its locking condition also simultaneously moves the pawls from said surface.

In another aspect the present invention consist in a rotatable hitch assembly for connecting a trailer to a tow vehicle comprising:

a base member engaged or engagable to a trailer a second member to or from which a coupling arm adapted to connect to the vehicle extends, said second member rotatably engaged about a vertical axis of rotation with said base member, a rotatable ratchet arrangement between said base and second members said arrangement including a ratchet surface, a first ratchet surface engagable means and a second ratchet surface engagable means, each operative with said ratchet surface in preventing relative rotation between said base and second members in one and opposite directions only.

In a further aspect the present invention consists in hitch assembly for connecting a trailer to a tow vehicle, wherein the hitch assembly is of rotatable and telescopic kind as herein described.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

The invention consists in the foregoing and also envisages constructions of which the following gives examples.

BRIEF DESCRIPTION OF THE DRAWINGS

One preferred form of the present invention will now be described with reference to the accompanying drawings in which.

DETAILED DESCRIPTION OF THE INVENTION

Figure 1:
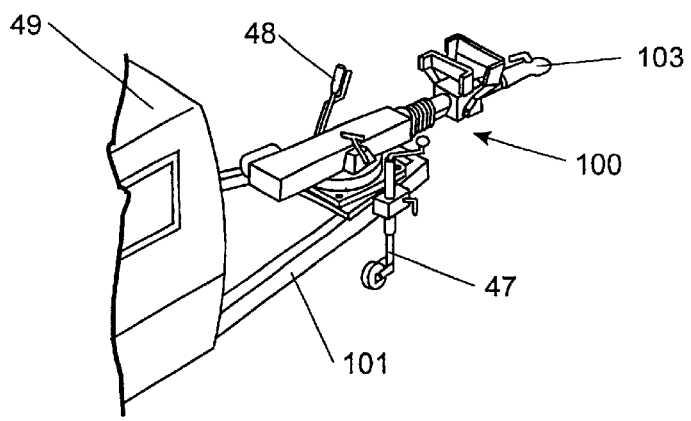
FIG. 1 is a perspective view of the hitch assembly incorporating the present invention.
Figure 2:
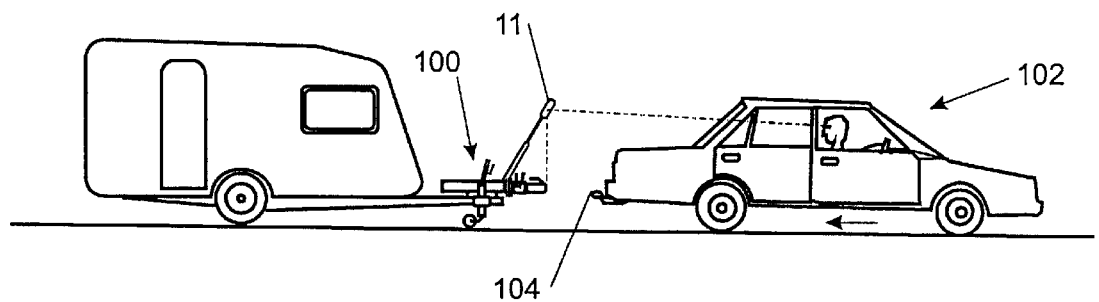
FIG. 2 is a side view of a trailer and towing vehicle and illustrates an optional reflective alignment aid in use.

With reference to FIG. 1, the present invention consists of a hitch assembly 100 which is connected to or forms part of a drawbar 101 or other like extension of a trailer 49 such as a caravan or boat trailer, domestic trailer, commercial trailer or the like.

The hitch assembly 100 of the present invention preferably provides at least one of two movements which allows for a quick and easy connection to be made between a towing vehicle such as a car 102 and the trailer 49. In a first aspect the movement achievable by the hitch assembly 100 of the present invention is an axial or telescoping extension to lengthen or shorten the effective drawbar length of the trailer. In a second aspect the movement which may be achievable by the present invention is a rotation of the means engagable of the female coupling member 103.

Figure 3:
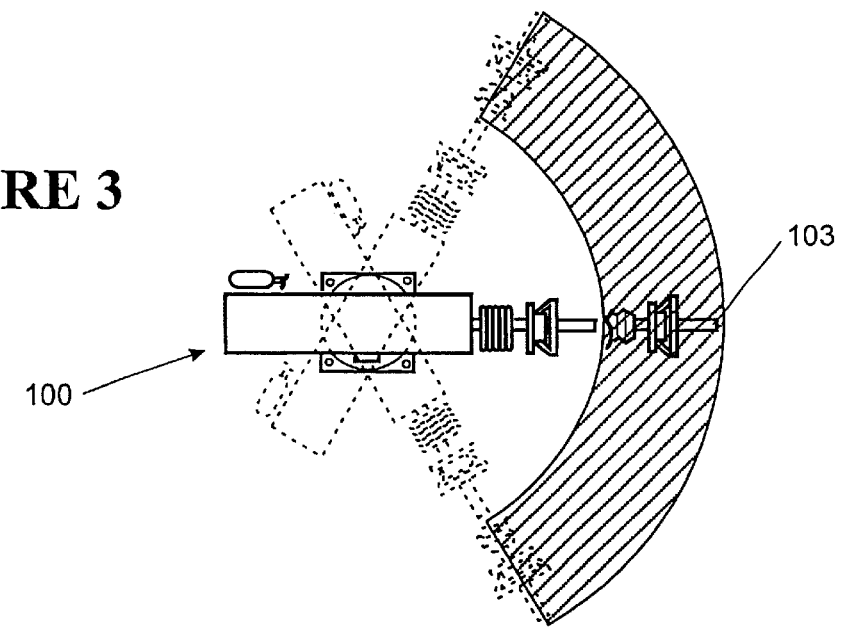
FIG. 3 is a plan view of the hitch assembly incorporating the present invention.

With reference to FIG. 3, the hitch assembly 100 is in a form connected to the drawbar of a trailer and is of a kind which provides one of or both degrees of movement, namely the telescoping displacement and the rotational movement of the female coupling member 103. The hitching of a trailer to a towing vehicle can hence be achieved by moving the tow ball 104 of a towing vehicle within the zone as shaded in FIG. 3 whereafter the hitch assembly 100 can be moved for the female coupling member 103 to be engaged with the tow ball 104. A substantially vertical displacement of the female coupling member may be achieved by the jockey wheel 47.

In a broad sense the present invention may include at least one of the degree of movement as herein described. The Rotational degree of freedom may be locked by one or both of two preferred means.

For visual assistance whilst a towing vehicle is being manoeuvred in position with respect to the female coupling member, a hook position indicating member 11 may be provided which is preferably in the form of a mirror positioned to reflect the location of the female coupling member into the line of sight of the driver. This is preferably a mirror mounted on a telescopic and pivotable rod 6, pivotable from the rigid elongate member 105.

With reference to the accompanying drawings, one preferred form of the present inventions as illustrated incorporates both degrees of freedom (both telescopic and rotational) however it will be appreciated that one or the other degree of freedom may not be present in one or other of the inventions as herein described. Most benefits herein described are where the combinations to provide both degrees of freedom of movement, are present.

Figure 4:
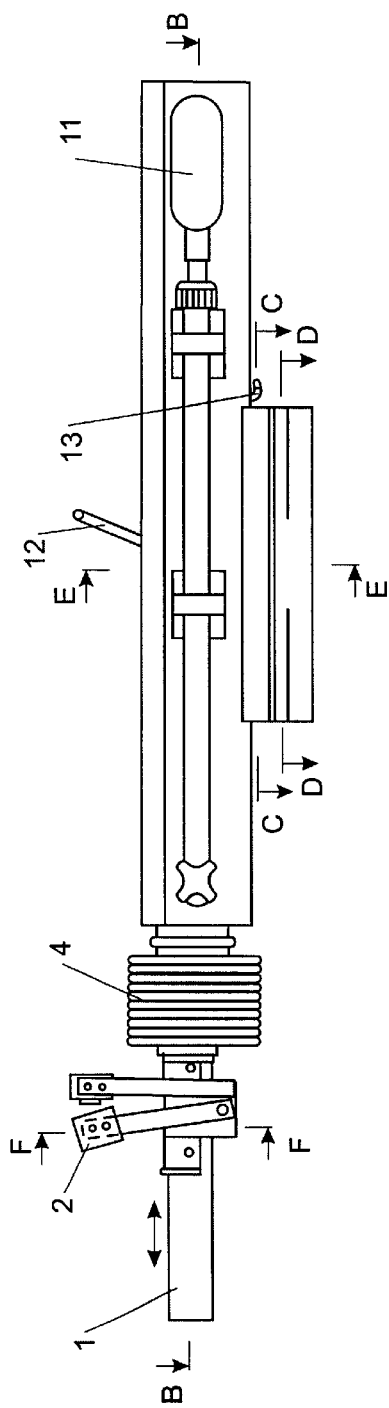
FIG. 4 is a side view of the hitch assembly incorporating the present invention.
Figure 5:
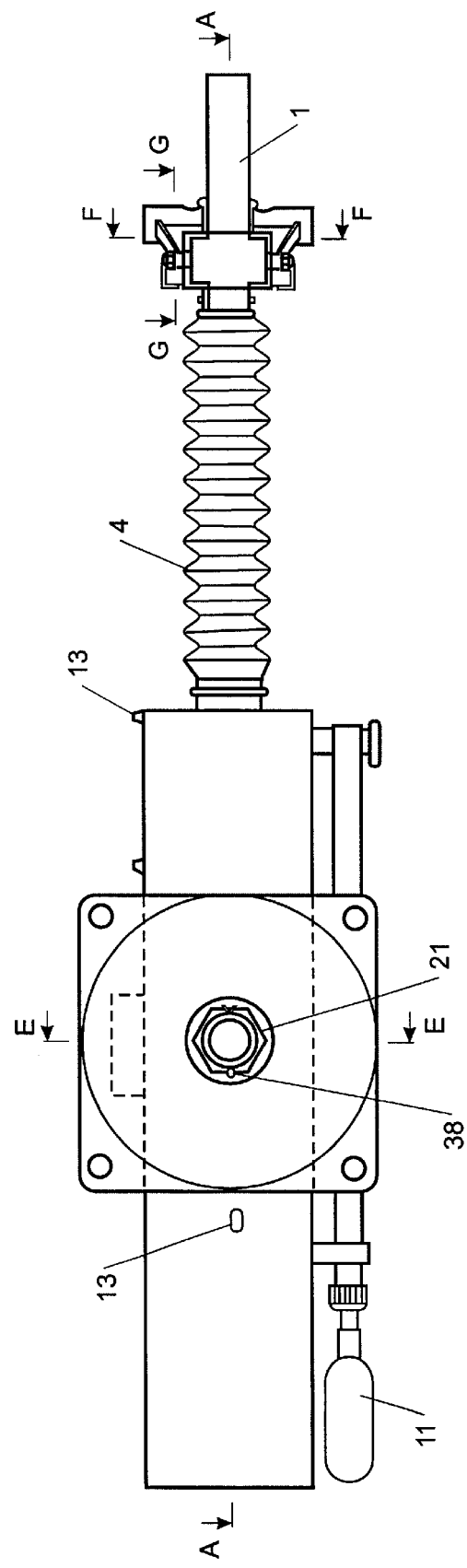
FIG. 5 is a bottom view of FIG. 4 rotated 180°.
Figure 6:
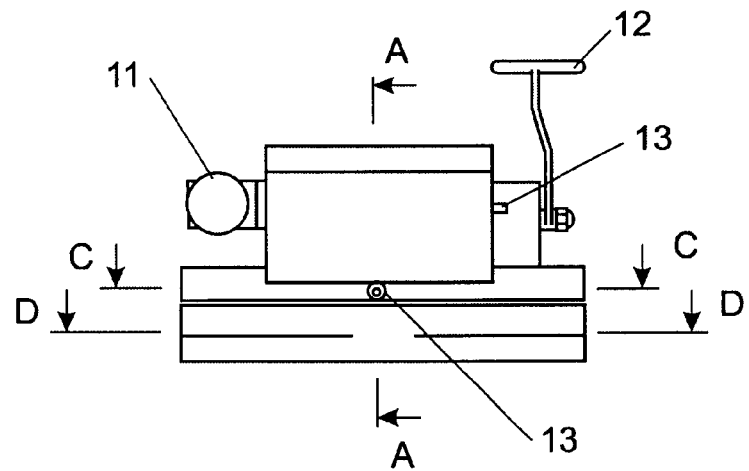
FIG. 6 is an end view of FIG. 4.
Figure 7:
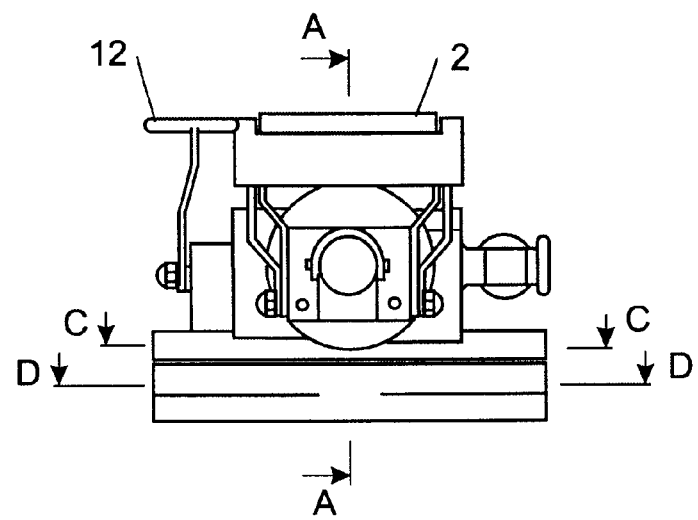
FIG. 7 is the other end view of FIG. 4.
Figure 10:
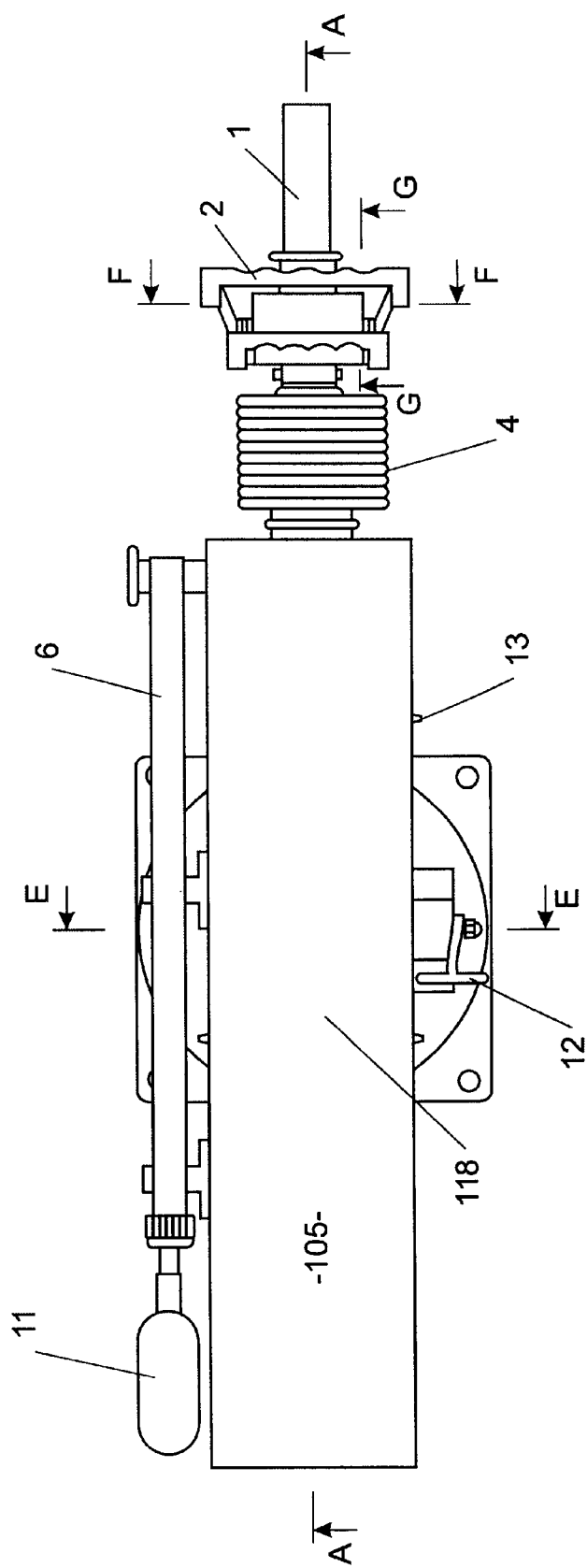
FIG. 10 is a top view.

With reference between FIGS. 4 and 5, there is shown the displacement between a fully retracted and fully extended telescopic displacement of the hitch assembly. With reference to the mode in which this displacement can be achieved, we now refer to FIGS. 11 and 12. The hitch assembly comprises of a displaceable coupling arm 1 which at or towards it distal end may be provided with a means engagable such as a female coupling member 103, for its connection to the tow ball of a tow vehicle (the female coupling member 103 is not shown in FIGS. 10 or 11). As an alternative to a female coupling member, the coupling between the trailer and the vehicle may be made by a gudgeon pin type arrangement as often found on farm vehicles. Other alternatives are also possible. The displaceable coupling arm 1 is telescopically engaged with a first member (preferably and hereinafter referred to as the rigid elongate member 105). This together provides a telescoping assembly which is secured to or forms part of (whether directly or indirectly) the draw bar 101 of the trailer. The rigid elongate member 105 preferably remains secured to the drawbar of the trailer (but in the most preferred form is rotatable thereto but not displaceable thereto). In the preferred form this rigid elongate member is supported from the drawbar by a rotatable base plate such that both rotation and displacement of the female coupling member 103 can be achieved.

The rigid elongate member 105 preferably receives part of the displaceable coupling arm 1 within a cavity 106.

As the displaceable coupling arm 1 is preferably straight, rigid, elongate and hence double ended, it is at least that portion of the displaceable coupling arm 1 extending from one distal end towards the other distal end that is within the cavity 106.

Preferably said first member and said coupling arm include features defining a ratchet relationship of a kind which can be moved to an inoperative condition, and which in the operative condition acts to prevent telescopic elongation between the coupling arm and the ratchet surface.

Figure 11:
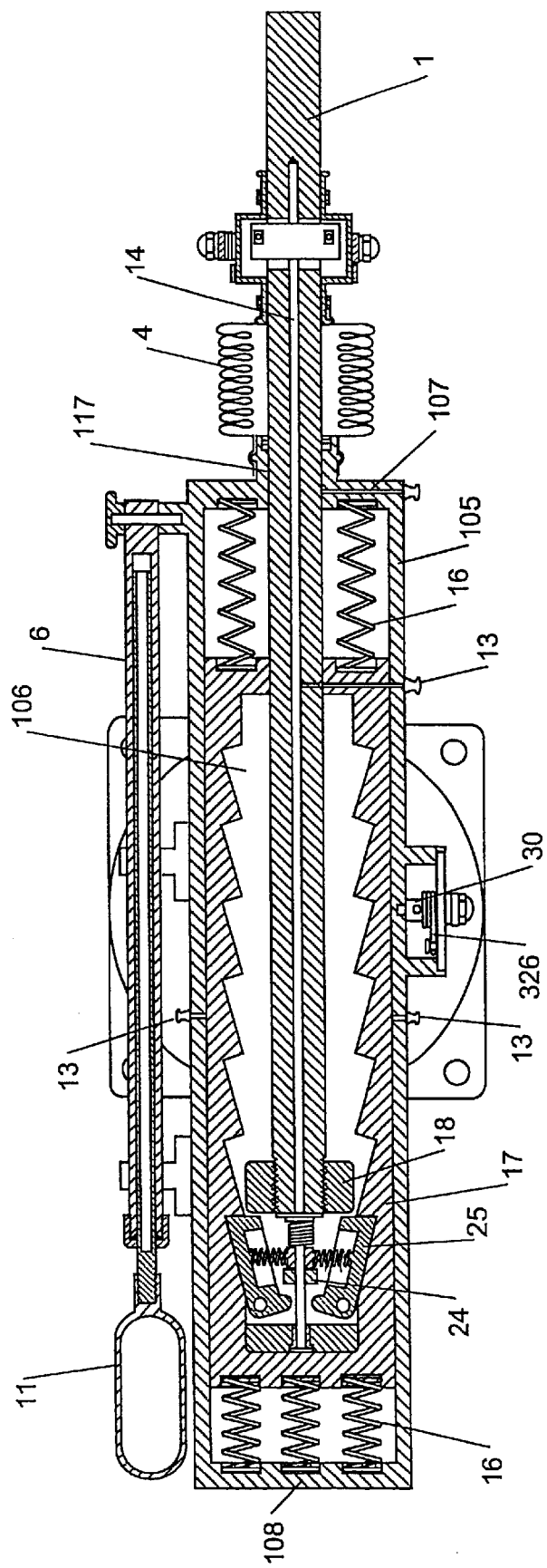
FIG. 11 is a sectional view through section BB.
Figure 18:
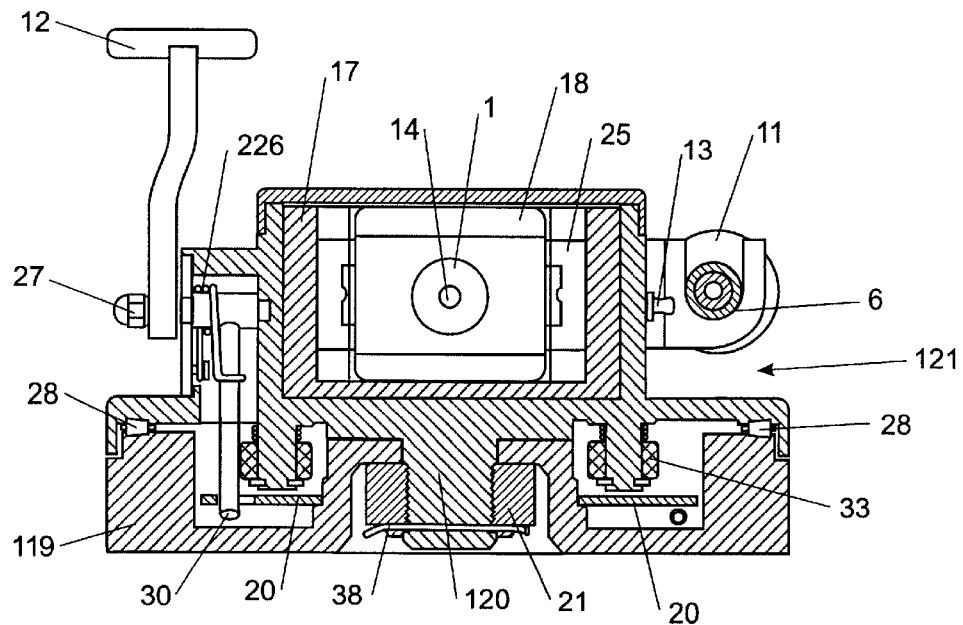
FIG. 18 is a section through section EE of FIGS. 4 and 5.
Figure 20:
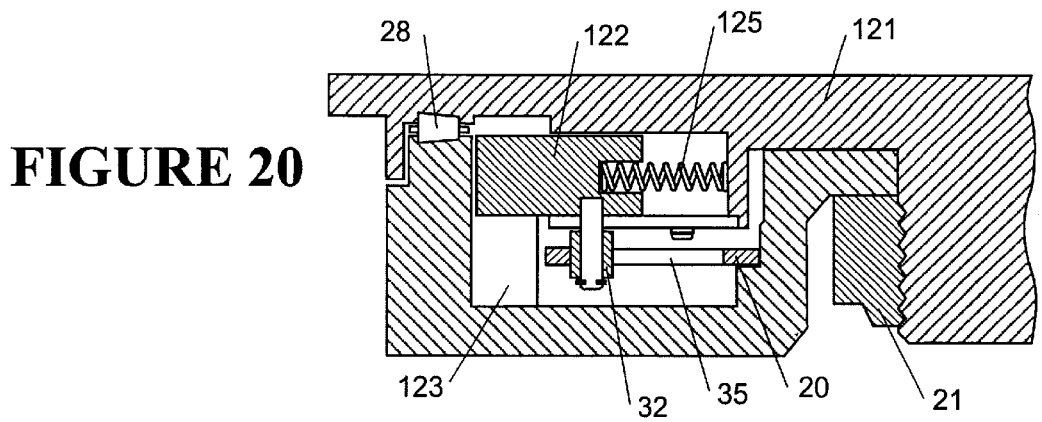
FIG. 20 is a section at section H—H of FIG. 22.

Disposed within the cavity 106, whether it is as a direct extension of the rigid elongate member 105 or an insert therein, is a means defining a wall surface with relief or ratchet features 17. In the most preferred form and as shown with reference to FIG. 11, this means defining a wall surface is preferably a separate member within the cavity 106 of the rigid elongate member. In cross section this member is substantially "U" shaped as can be seen in FIG. 18. The means 17 is axially displaceable within the cavity within limits inner and outer defined by end walls 107 and 108 of the cavity. There is preferably also the provision of biasing means 16 to bias the means 17 towards one end or away from both ends. With reference to FIG. 11 there are biasing means 16 acting from both end walls 107 (outer) and 108 (inner) towards the means defining the wall surface to bias it towards a position where there is no contact between it and the end walls.

The means 17 is such as to allow a deployable member 25 which is deployable from the displaceable coupling arm 1, within the cavity, from being engaged therewith. Such engagement of the deployable member with a relief feature of the wall surface of the means 17 will preferably lock the displaceable coupling arm 1 with the means 17 in at least one direction of telescopic displacement The locking may be in both directions.

However in the most preferred form the means providing the wall surface with relief features 17 is preferably a ratchet frame wherein the relief features are provided on two opposite and inwardly facing surfaces of the means 17 and are of a ratchet shaped nature preventing, when the deployable member 25 is in a deployed state, the displaceable coupling arm 1 from telescopically extending the effective drawbar length of the trailer. In this most preferred form the deployable member is of a complementary ratchet type nature that will allow (whilst in a deployed state) for the effective drawbar length to be reduced by a retraction of the displaceable coupling arm within the cavity, until the coupling arm reaches its inward limit of displacement The deployable member 25 is preferably engaged to the displaceable coupling arm 1 at or near its distal end within the cavity. The deployable member 25 preferably consists of two ratchet blocks which are pivotably moveable between a deployed state as shown in FIG. 11 and a retracted state as shown in the upper part of FIG. 12. Each pivot axis 41 is such as to move a ratchet frame engagable portion 109 of the deployable member outwardly from the displaceable coupling arm 1 to engage with a non return surface 110 of the ratchet frame. Such engagement results in the non return surface 110 providing a force to the deployable member 25 to prevent it (when deployed) from allowing the extension of the telescopic assembly.

The deployable member 25 is provided naturally in a state if bias towards a deployed condition. In the preferred form such a deployed state will allow for retraction of the telescopic assembly to occur but will prevent extension.

The deployable member 25 is preferably biased to a deployed state by a biasing means such as a spring 116.

Preferably the deployable member is moveable to a retracted state to allow for an axial extension of the telescopic assembly to occur. Such actuation results in the retraction of the deployable member 25 to a state where the ratchet frame engagable portion disengages with the non return surface of the ratchet frame.

Figure 12:
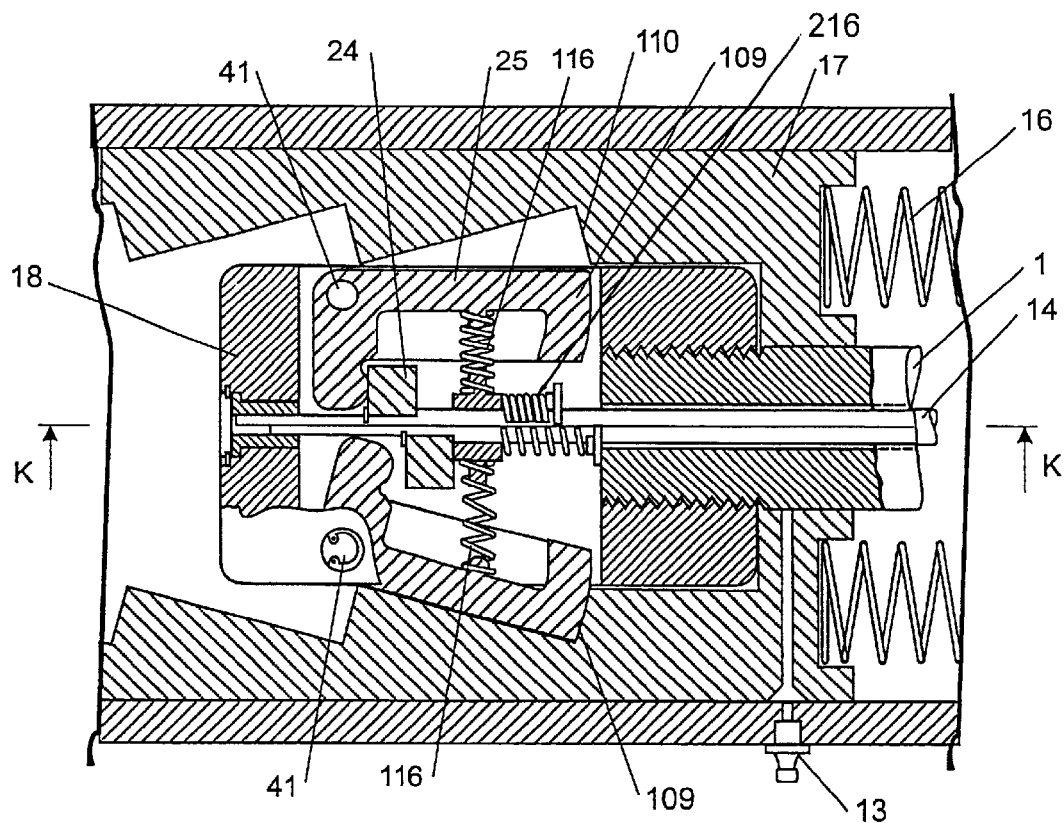
FIG. 12 is a sectional view through section JJ.

The positive actuation of the deployable member 25 is achieved by a means to effect rotation 24 to the deployable member to rotate it about the axis 41. The most preferred form of the deployable member is of a "L" shape wherein the axis 41 is provided at the apex of the "L". The other leg of the "L" shaped deployable member extend preferably inwardly towards the axis of the displaceable coupling arm. At or towards this distal end of the leg extending towards the coupling arm, a means to effect rotation 24 can act on the deployable member. With reference to FIG. 12, it can be seen that where the means to effect rotation 24 is displaced to the left (with reference to the page), it will result in the rotation of the deployable member to move from a deployed state to a retracted state. Movement in the opposite direction by the means to provide rotation 24, results in the deployable member moving to a deployed state as a result of the preferred biasing provided by the spring 116. Alternatively however the movement may be achieved by a direct link formed between the means to provide rotation and the deployable member wherein it can effect positive displacement in both directions.

The means to provide rotation 24 is preferably displaced in the axial direction of the displaceable coupling arm as a result of push rod 14 which is moveable by for example a trigger 2.

The trigger 2 is preferably provided on the displaceable coupling arm 1 and can move therewith as the coupling arm extends and retracts as part of the telescopic assembly.

Figure 14:
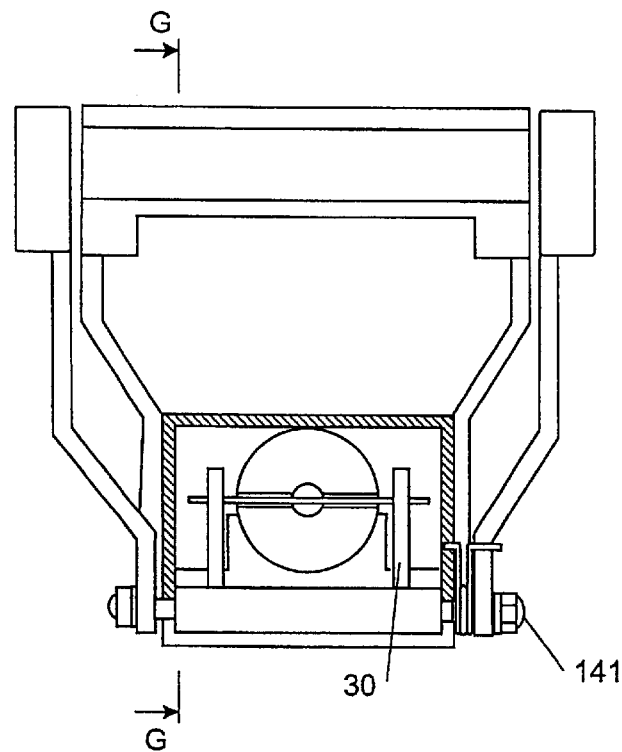
FIG. 14 is a sectional view through section FF illustrating detail of the axial lock actuation means.
Figure 15:
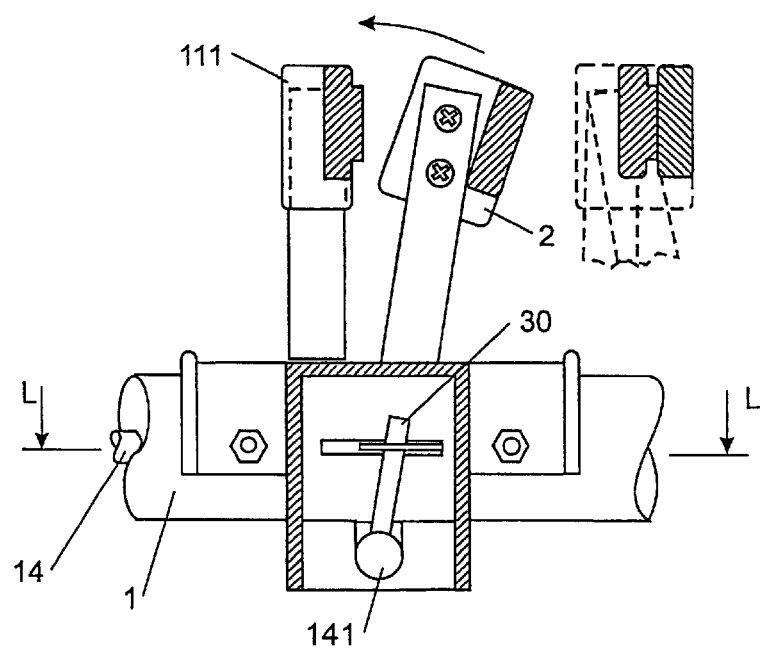
FIG. 15 is a sectional view through section GG illustrating detail of the axial lock actuation means.
Figure 16:
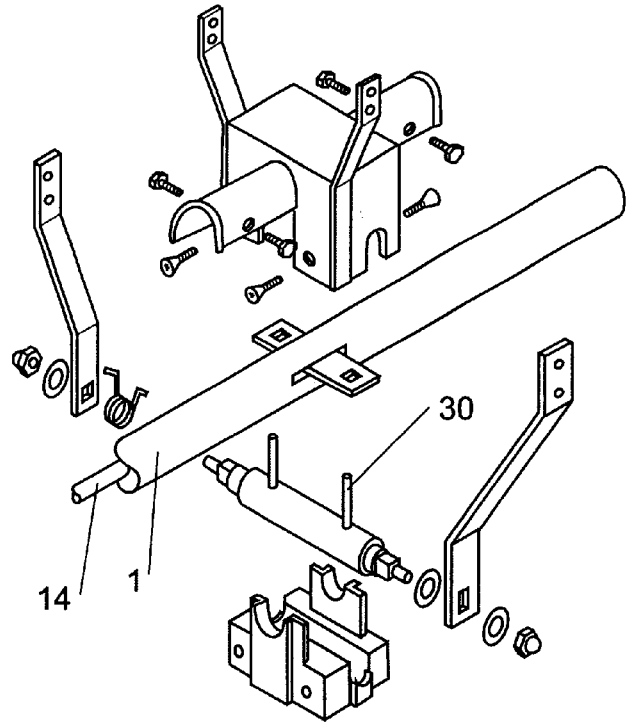
FIG. 16 is an exploded assembly view of the axial lock actuation means.
Figure 17:
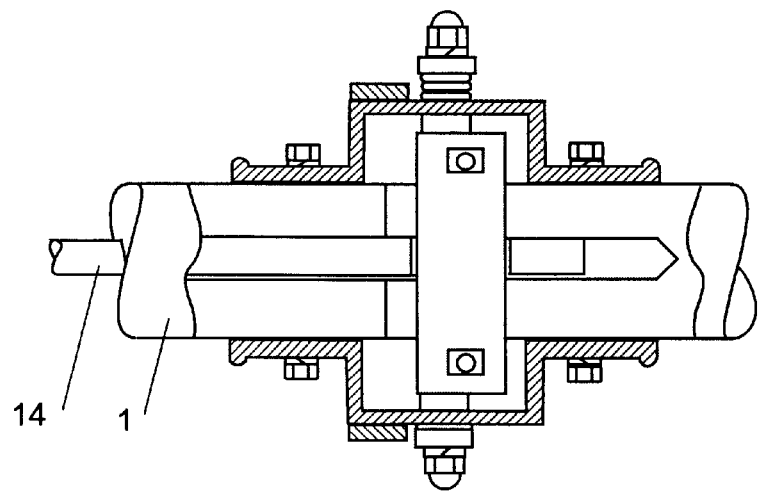
FIG. 17 is a section through section LL of the axial lock actuation means.
Figure 19:
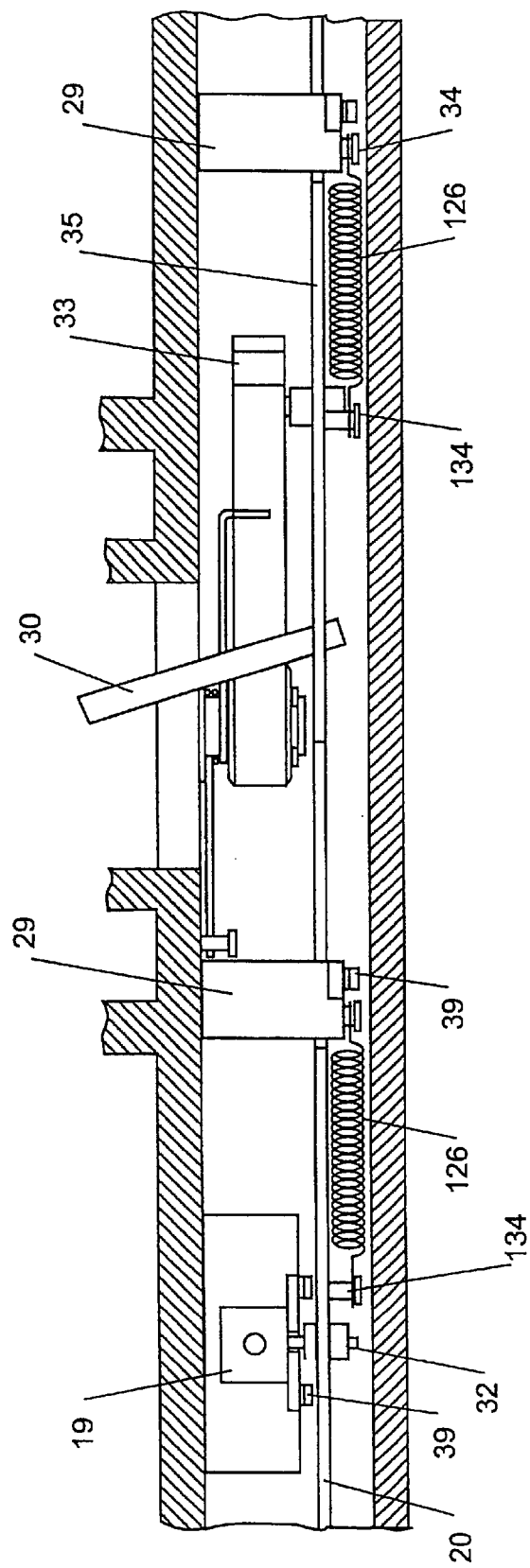
FIG. 19 is a section along section II of FIG. 21.

As, in the preferred form, the push rod 14 is located internally of the displaceable coupling arm, the actuation of the push rod by the trigger is preferably achieved by the provision of a trigger pivot axis 141 located off-centre from the axis of the push rod and displaceable coupling arm. With reference to FIGS. 14 and 15, this axis 141 is preferably provided below the axis of the push rod and extends swing rods 30, upwardly for engagement (whether directly or indirectly) with the push rod. FIG. 16 illustrates an exploded assembly view of the components of the actuation means which includes the trigger 2. As can be seen the trigger 2 will allow for the pivoted rotation about the axis 141, of the swing rods to thereby move the push rod axially with respect to its own axis and the axis of the displaceable coupling arm. The displacement of the push rod in turn displaces the means to effect rotation 24, for the deployable members 25, so as to move these between a deployed and retracted condition.

To allow convenient one hand actuation of the trigger, a stationary handle 111 may be provided adjacent to the trigger 2 such that a hand of the user can clasp the handle 111 and the trigger 2 to bring these more proximate to each other to cause the deployable member 25 to become retracted.

Preferably a spring or other biasing means is provided to bias the push rod to a condition where the means to provide rotation 24 are displaced towards and/or biased towards a condition where the deployable members 25 can remain at a deployed condition. Such a spring 216 may be provided as shown in FIG. 12 but may alternatively be provided at the other distal end of the push rod, to pull the push rod to a condition where the means to provide rotation are biased away from engagement with the deployable member 25.

Alternatively the push rod may be lockable in a position where the deployable member is in a deployed condition. However in the most preferred form the deployable member when in a deployed condition is designed to move to a retracted condition only upon the displacement of the displaceable coupling arm in a direction to retract the telescopic assembly or when the trigger is actuated to retract the deployable member and allow extension of the assembly to occur. With the utilisation of the springs 116, when displacement of the displaceable coupling arm is a retraction direction occurs, the deployable member will move to a retracted condition until the next non return surface becomes aligned with the ratchet frame engagable portion of the deployable member. It can be seen that without any user actuation of the deployable member, there is an automatic tendency when a compression force between the displaceable coupling arm and the rigid elongate member is provided, for the deployable member to cause the displaceable coupling arm to move to a fully retracted condition as for example shown in FIG. 9. This fully retracted condition is preferably where the distal end of the displaceable coupling arm (or its extension such as the deployable member assembly) reaches the inner most end 108 of the cavity.

Figure 9:
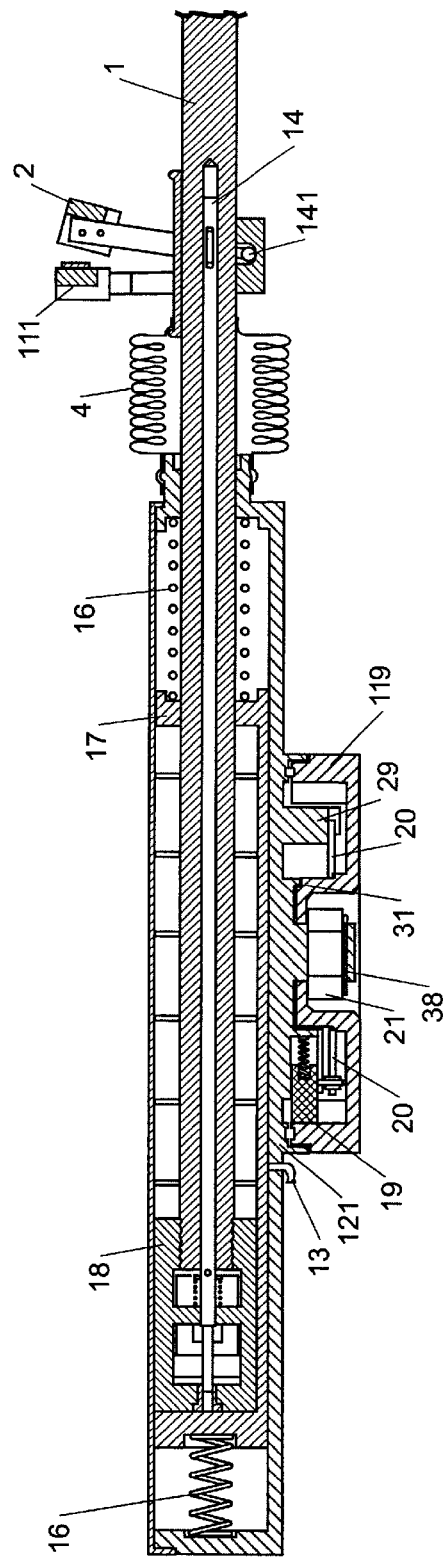
FIG. 9 is a sectional view through section AA.
Figure 13:
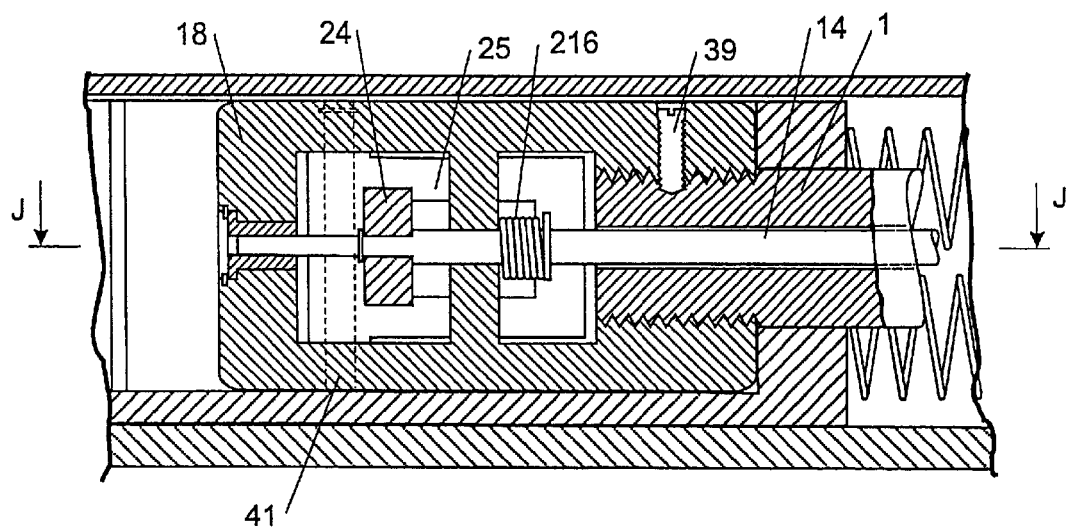
FIG. 13 is a sectional view through section KK.

With reference to the side views of the cavity as shown in FIGS. 13 and 9, it can be seen that the relief features are not provided as annular ribs of the means 17. The relief features are preferably substantially ruled surfaces within a substantially rectangular or "U" shaped cross sectional shaped rigid elongate member 105. This rectangular nature (as opposed to a circular nature) provides the benefit of ensuring the displaceable coupling arm does not rotate about its axis.

Preferably there are a plurality of reliefs provided by the means 17 and as for example shown in FIG. 11, there are seven pairs of such relief features provided in the means 17, one of each pair being on either side of the substantial longitudinal rigid elongate member 105.

To provide rotational stability between the rigid elongate member and the displaceable coupling arm, the rigid elongate member preferably has a throat region 117 which slidingly provides a secure location of and about the displaceable coupling arm at the point where the arm extends from the rigid elongate member. This throat region 117, in combination with a distal end supported region of the displaceable coupling arm within the cavity, will provide at least a two point support of the other displaceable coupling arm with the rigid elongate member for the prevention of relative rotation there between. With reference to FIG. 12 and 13, it can be seen that the distal end of the displaceable coupling arm 1 is of a width substantially commensurate to that of the general narrowest width of the cavity in both a horizontal and vertical condition, save for the deployable member which provides a variable width to this assembly.

The deployable member assembly 18 which contains the deployable member and provides the axle of the axis 41 is preferably secured to the distal most end of the displaceable coupling arm 1. As can be seen with reference to FIGS. 12 and 13 such connection is by way of a threaded engagement, but other forms of engagement may also be utilised. To prevent disengagement occurring, a grub screw 39 may be utilised.

The end biasing springs 16 which may be provided in the present invention and remain in place by the use of recesses provided in both the means 17 and rigid elongate member 105.

In the form where the means 17 is provided to be displaceable within the rigid elongate member, lubrication points 13 may be provided to lubricate the relative displacement therebetween and also the relative displacement between the means 17 and the displaceable coupling arm 1.

To aid in sealing of the cavity 106 of the rigid elongate member, a dust protective shield 4 may be provided at the throat region 117. This dust protection shield is preferably of a bellow type of nature which will allow for it to be extended between a fully retracted and fully extended condition of the displaceable coupling arm with respect to the rigid elongate member.

Figure 8:
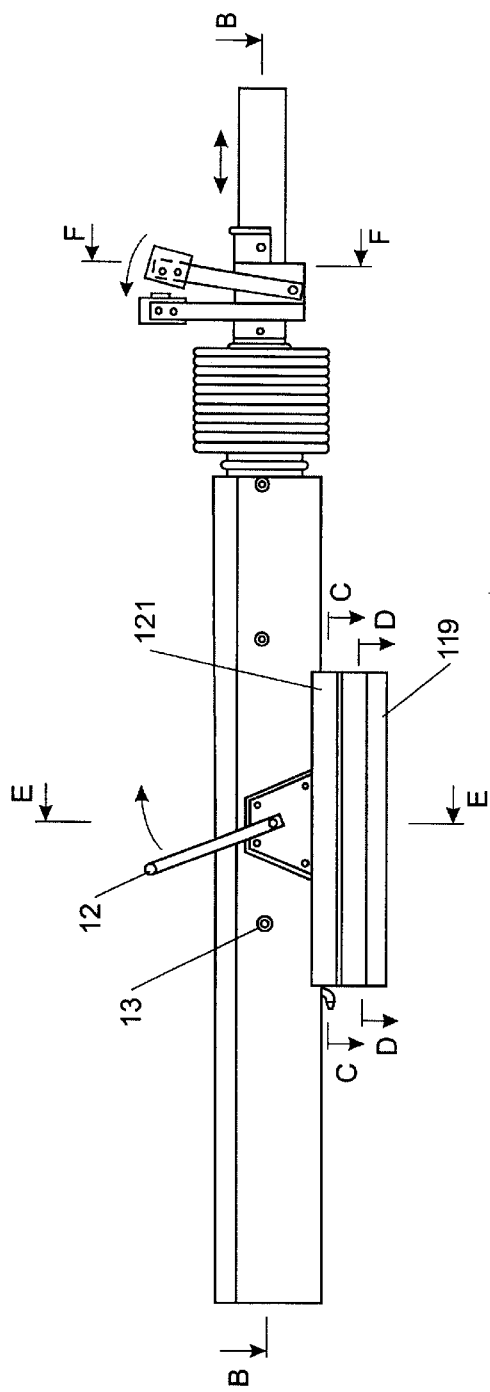
FIG. 8 is the other side view of that shown in FIG. 4.

We now refer to the other aspect of the invention of this current specification, namely the aspect of the provision providing the rotation. In the preferred form the rotation occurs about the axis of rotation 118 which is preferably vertical. At the axis of rotation, the assembly is secured to a base 119 which forms part of or is secured to a rigid portion of the trailer such as the draw bar which is preferably an extension of the chassis of the trailer. The engagement may be achieved by the provision of a stub axle 120, as for example shown in FIG. 18. This axle can extend through an aperture in the base 119 and may secure the upper portions or second member other pivot region (i.e., those connected to the telescopic assembly) to the base by a nut 21 and for example a split pin 38 to locate it to the base. Further regions of contact between the two members of the pivot may include such means as to reduce friction there between. These means for example may be a roller bearing 28 and/or well lubricated contact surfaces. As for example seen in FIG. 8, the base is adapted to the secured to an extension of the trailer chassis such as the draw bar 101 and the upper rotatable portion 121 (also hereinafter to as the second member) is secured to the ridged elongate member.

Whilst rotation between the upper rotatable portion and the base is desirable to allow for the positioning of the tow coupling with respect to the tow connection of the vehicle, independently of having to move the trailer, once the coupling is made a rigid connection is required between the tow vehicle and the trailer. Merely providing a pivotable rotation of the draw bar without a means to create rigidity between the rotation parts, will result in a very uncontrolled tow of the trailer which can lead to accidents.

The nature of the towing of a vehicle means that the force applied to the hitch assembly will be in a direction of travel of the tow ball (or the tow vehicle). This in turn means that the forces transmitted to the trailer also tend in a direction of travel of the tow vehicle. There is hence a tendency for the direction of alignment of the wheels of a trailer to be parallel with the direction in which the force by the towing vehicle is applied when the vehicle travels in a straight path. In the arrangement of the present invention, once a vehicle starts to tow the trailer, the direction of force applied about the pivot axis will tend to move the direction of alignment of the wheels parallel with this force. In essence this means in the preferred form, that the assembly (being of a general elongate nature) moves to a position parallel with the direction of travel of the trailer. This position is hereinafter referred to as the mid most position and is preferably the desirable position for towing a trailer.

Figures 22, 23:
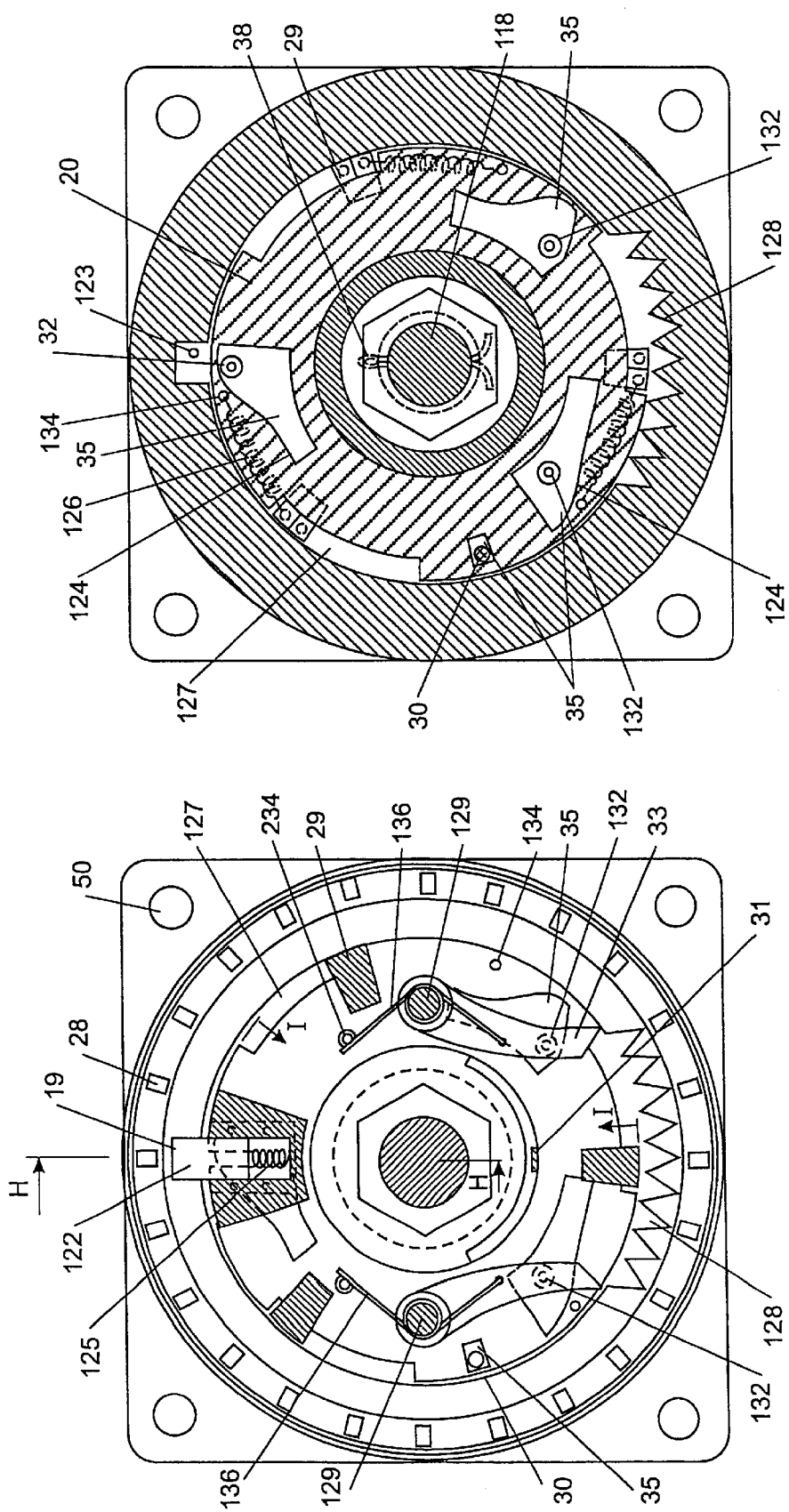
FIG. 22 is a section at section C—C of FIGS. 4 and 8.
FIG. 23 is a section at section D—D of FIGS. 4 and 8.

Since in the preferred form a general alignment of the draw bar occurs once a vehicle starts to two a trailer it is desirable in the aligned condition for the tow bar to lock into a ridged (non rotatable) condition. It is to this extent that a locking means 19 is preferably provided between the upper rotatable part and the base. This locking means 19 can selectively move between a locked condition as shown in FIG. 22 and an unlocked condition. In the preferred form the locking means consists of a moveable lug 122 carried by the upper rotatable portion 121 and is displaced relatively thereto between a first condition (the locked condition) and a second condition (the unlocked condition). The only way in which the lug 122 can move to the locked condition is when it is in alignment with a recess of a complementary shape of a portion (preferably the distal end) of the lug. This recess is preferably provided at an inwardly facing surface of the base 119 and hence for the lug to move from the second condition to the first condition, it travels substantially radially and outwardly in respect of the axis of rotation 118. The location of the lug in the recess when they are aligned, is preferably when the alignment of the hitch assembly occurs with respect to the trailer travel direction. The shape of the recess and the lug is such that when the lug is in the first condition, it can not automatically travel to the second condition and hence the arrangement remains in a securely locked arrangement. More than one lug may be provided. These may be separated and spaced at locations about the axis of rotation 118. More lugs means a stronger locking can be provided. The lug is moveable from its second condition to its first condition to its first condition upon the alignment with the recess 123. The lug may alternatively be a latch that rotates to move between its locking and unlocked condition.

The lug is also removable from its first condition to its second condition, as a result of the use of a cam plate 20.

As can be seen in FIG. 23, this cam plate 20 is preferably provided with apertures 35 which have a camming surface 124 with which a cam follower 32 as part of the lug 122 can move. The cam plate 20 preferably rotates about the axis of rotation 118 and hence an appropriately shaped camming surface 124 will displace the lug at least from its first condition to it second condition. Displacement in the other direction may not necessarily be provided by a camming surface of the cam plate 20 and preferably such return from the second condition is provided by a biasing means such as a spring 125. Therefore in the preferred form the camming surface only moves the lug from its first condition to its second condition.

Figure 21:
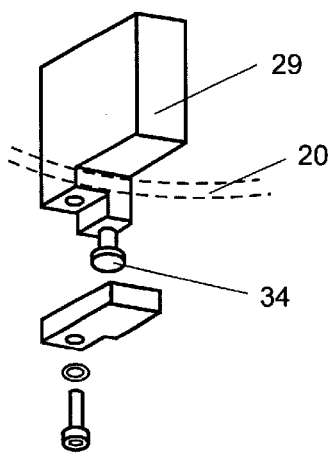
FIG. 21 is a detailed exploded perspective of the stops/guides 29.
Figure 24:
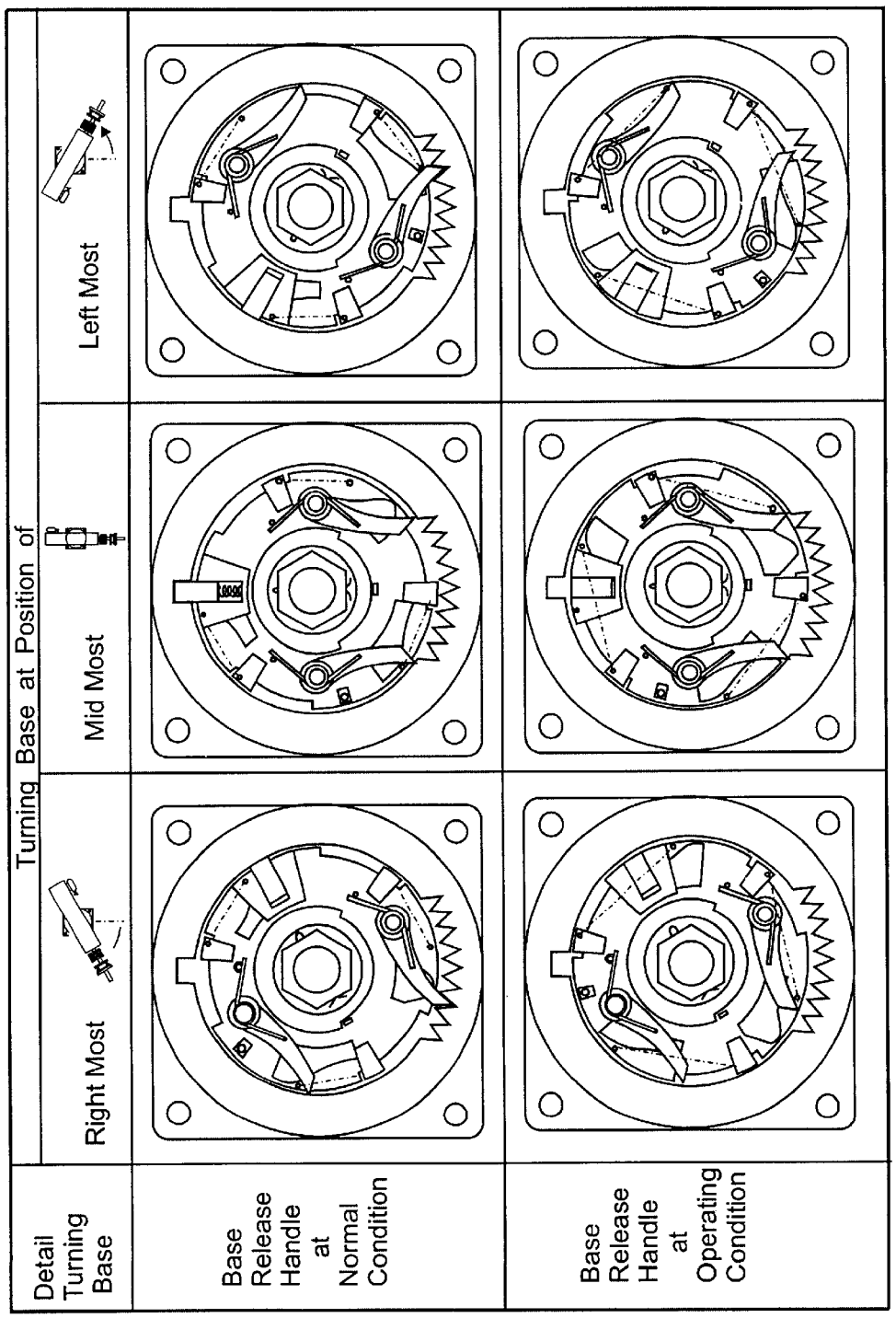
FIG. 24 is a table illustrating relative rotation between the first and second members.
Figure 25:
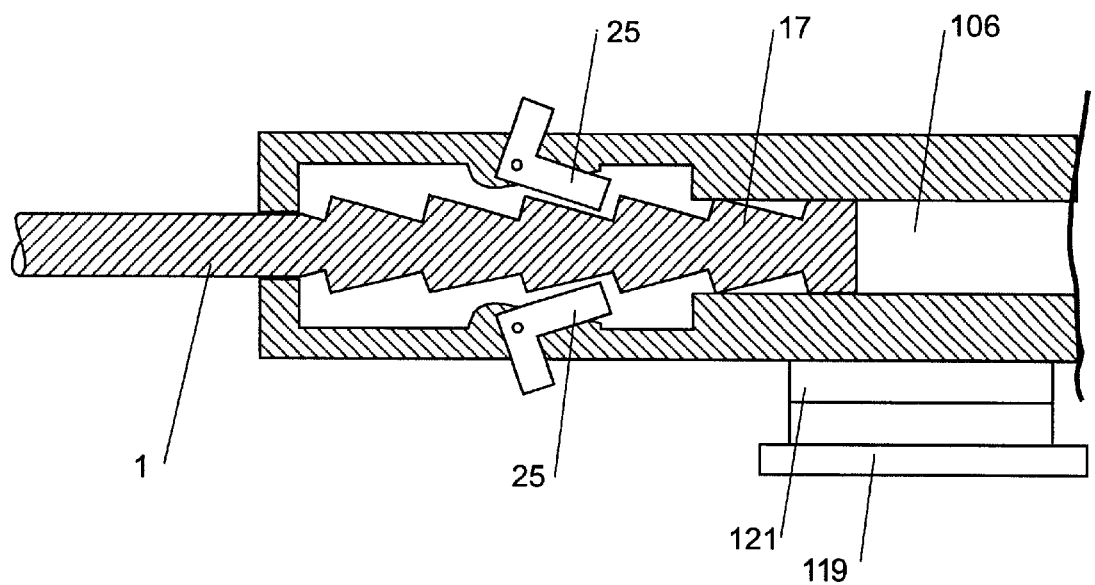
FIG. 25 is a sectional view longitudinally through a hitch assembly of the present invention illustrating an alternative ratchet arrangement of telescopic assembly.
Figure 26:
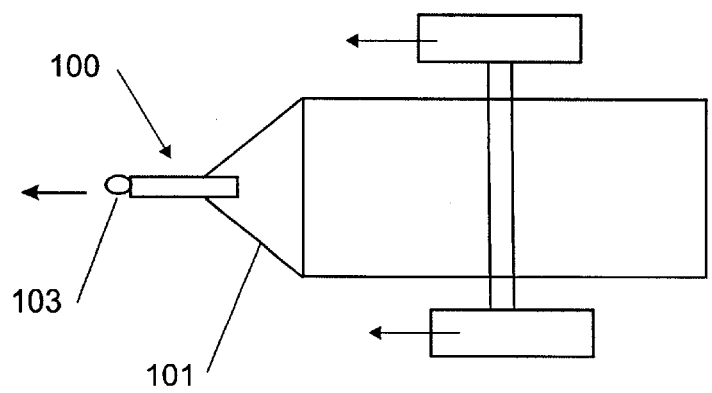
FIG. 26 illustrates the preferred alignment direction.

Whilst the cam plate 20 moves about the axis of rotation 118 preferably with the movement of the second member 121, its rotation relative to the second member is controllable by a manually actuable means 12. This manually actuable means is preferably a handle which via a linkage operates a swing rod 30 which moves in respect of the camming plate in a substantially tangential direction. The swing rod is preferably located with the camming surface through an opening 35 and merely extends through this opening. The swing rod moves the camming disk relative to the upper rotatable portion between limits required for the camming surface to move between its first and second condition. Where the camming surface has a long pitch of movement, the movement provided by the swing rod to the camming disk needs to correspondingly be also large. A short pitch of movement of the camming surface means that the swing rod only needs to move through a shorter distance to effect the movement of the lug between the first and second condition. The actuable means 12 preferably acts about an axis 27 which in turn is also the axis about which the swing rod 30 acts. This axis is preferably secured to a point on the upper rotatable part 121. The camming disk 20 is preferably supported in respect of the rotatable axis 118 by being located on a ledge 124 of the base but also at its perimeter by a plurality of disk holders 29. With reference a FIG. 21 the disk holder 29 is provided with a slot through which the disk thickness can rotate. FIG. 21 illustrates a suitable exploded arrangement illustrating the parts and assembly of this disk holder. The disk holder preferably also provide the points 34 with which a spring 126 located at the other end with the camming disk (at point 134) can engage. The direction of bias that this spring 126 provides is for the camming disk to move to a direction where the camming surface will allow for the lug to locate with the slot 123. A spring 226 to bias the actuable means may also be provided for this purpose. There are preferably three disk holders substantially equally spaced about the perimeter of the cam disk and preferably each provides such points to allow for a spring 126 to bias the cam disk to a condition to allow for the lug to move to its first condition. With reference to FIG. 24, it is of course only possible for the lug to move to its first condition when there is alignment since until then the lug will act against the concave wail of the base over which it is free to rotate. The perimeter of the cam disk is preferably provided with recesses 127 which have stop surfaces at each of their ends at with which a stop surface of the upper rotatable portion can engage. Preferably such a stop surface is provided by the disk holder 29 and with reference to FIG. 24 it can be seen how the stop surfaces of the disk holder can move between the limits of the slots of the cam disk. The limits of the slots of the cam disk are such as to be of a sufficient length to allow for the camming surface to travel a distance of its full effect.

Likewise rotation between the upper rotatable portion 121 and the base 119 may be limited to a specific arc. An angle limiting feature 31 between the upper rotatable portion 121 and the base 119 may be provided for such a purpose. Such a angle limiting feature 31 may be an upstand moveable within a slot of the other portion wherein the slot is of a limited arc such that when the upstand reaches the distal end of the arc of the slot, further movement will be prevented.

It can hence be seem that once alignment of the assembly occurs with the direction of alignment of the wheels, the lug snaps into a locking condition to prevent further rotation of the assembly relative to the trailer.

The present invention is preferably also provided with an arrangement which prevent rotation of the hitch assembly relative to the trailer away from the aligned condition. This arrangement is provided by a rotational ratchet arrangement between the base and the second member. The arrangement can however be disengagable when it is desirable for the user to manipulate the rotation of the hitch assembly. Such means defining the arrangement are hence movable between an active and inactive condition by the user of the present invention. In their inactive condition, they do not prevent such rotation away from the aligned condition and such inactive condition will allow for a person to move the female tow coupling towards the tow ball of the vehicle by the rotation of the hitch assembly. The means consists of a ratchet type arrangement. A first portion of this arrangement is a ratchet surface providing means 128 preferably provided as part of the base. This ratchet surface is provided facing inwardly in respect of the base towards the axis of rotation 118. It lies on a radius about the axis 118 and is of a finite arc there about. Engagable with the ratchet surface providing means 128 are two retaining pawls 33 pivotable relative to the upper rotatable portion. These pawls are pivotably connected to the upper rotatable portion 121. They have distal end regions away from their pivot 129, which are of a complementary shape to the reliefs of the ratchet surface.

In one direction of movement of a retaining pawl relative to the ratchet surface providing means 128, the ratchet surface engagable region of the pawl will refrain such rotation because it engages with a surface of the ratchet surface providing means 128. In the other direction, the shape and position of the pivot is such that movement can occur. The distal ends of the retaining pawls are also able to travel smoothly and uninterrupted over the concave surface of the base where no such ratchet surface providing means 128 is provided. Each of the retaining pawls will prevent movement when in an active condition - of the upper rotatable member relative to the base in opposing directions. In the preferred form the direction in which each of the pawls will prevent relative rotation, is a direction of which the pawl extends from its axis of rotation 129 relative to the ratchet surface providing means. For example with reference to FIG. 22, in a clockwise rotation it is the right pawl which will prevent relative rotation between the base and the upper rotatable portion, once it engages with the ratchet frame. In the opposite direction of rotation it is the left most pawl which will prevent such rotation. In directions opposites to these, the pawl will allow for free rotation to occur since it does not lock with a ratchet surface. The provision of the pawls from the second member and the ratchet surface from the first may be reversed. the pawls my be carried by the base and the ratchet by the second member.

In for example in FIG. 24, the top row (from left to right) illustrates rotation in an anticlockwise direction. The female tow coupling rotation in the anticlockwise direction will firstly be allowed as the right most ratchet will allow for such movement to occur. Rotation back in clockwise direction can not occur since the right most ratchet is engaged with the ratchet frame and will prevent such movement in that direction. Likewise when the tow coupling is in the other extreme of rotation and rotating clockwise, rotation back in an anticlockwise direction is prevented by the left most retaining pawl.

The arc over which the ratchet surface providing means 128 is provided is such that when in the aligned condition neither of the pawls are engaged with the surface. It may however be that each of the pawls in this condition are engaged with the first ratchet slot of each of the distal ends of the ratchet surface providing means 128. In such an arrangement, the first ratchet gap/hole will also provide a locking of the telescopic assembly in a central condition. This proposition does allow for the locking lug to be dispensed with.

Much like, and preferably simultaneous with, the movement of the lug 122 from a retracted condition, each of the pawls can also be moved to an inoperative condition. The bottom row of FIG. 24 illustrates such a condition and is preferably achieved by further camming surfaces of the camming disk 20. Cam following means 132 of the pawls allow for the pawls to move to a retracted condition by the rotation of the camming disk.

Movement from the inoperative condition to the operative condition is preferably provided by springs 136 which bias the pawls to the operative condition.

In the inoperative condition the pawls are retracted from a condition where they can engage with the ratchet surface by the camming surface and will allow for the telescopic assembly to move through the arc of rotation.

Therefore a user of the present invention can move the lever 12 to move the cam disk such that the camming surface engage with the cam followers to preferably simultaneously move both pawls and the lug(s) to a disengaged condition and allow for the rotation of the apparatus to occur.

Once the lever 12 is released the cam surface allow the pawls and lug(s) to become operative which means that the rotation of the coupling arm is prevented from moving to a disaligned condition, and towards a conditions of alignment where it will then lock into place. The pawls are preferably of a length (pivot to ratchet engagement end) greater than the radial distance between the pivot and the ratchet surface. This allows for effective locking to be provided in one direction of rotation by the pawl.

Alternatively a stopper may be provided against which the pawls, away from its pivot acts to lock rotation of the pawl in one direction and when engaged with the ratchet.

The combination of preferred features herein described, hence allow for a convenient connection to be made by a vehicle to a trailer. Once the connection is made, the telescopic feature will operate to, when a deceleration of the tow vehicle (or reversal) occurs, reduce the effective tow bar length. The locking feature of the rotation will ensure that once aligned, the hitch assembly and drawbar become locked, and the ratchet arrangement of the rotatable assembly will prevent relative rotation of the tow bar and hitch assembly away from such alignment, when these are in their operative modes. In the in operative modes the hitch assembly can be maneuvered by the user to locate it appropriately for easy connection to the vehicle.

What is claimed is:

1. A telescoping hitch assembly for connecting a trailer to a tow vehicle comprising:

a first member engaged or engagable to a trailer, said first member comprising a cavity;

a coupling arm telescopically engaged with said first member, said coupling arm adapted for coupling at or towards a first distal end thereof to said vehicle; and a ratchet surface within the cavity and at least one movable deployable member carried by and pivotally connected to said coupling arm and engageable with said ratchet surface, wherein said moveable deployable member is moveable between an operative condition engaging the ratchet surface and an inoperative condition disengaged from the ratchet surface, and wherein said deployable member, when in its operative condition, prevents displacement of the coupling arm relative to the first member in a direction of telescopic extension.

2. The telescopic hitch assembly as claimed in claim 1 wherein said ratchet surface comprises a plurality of reliefs being of a shape to allow engagement by said deployable member.

3. The telescopic hitch assembly as claimed in claim 2 wherein said ratchet surface comprises a plurality of inclined steps arranged along a length of the ratchet surface allowing for engagement with the deployable member at different locations along said length.

4. The telescopic hitch assembly as claimed in claim 2 wherein said deployable member in operative condition is engaged with at least one of said reliefs of the ratchet surface to prevent telescopic extension but allow retraction of the coupling arm to said ratchet surface and in said inoperative condition is pivoted away from being engaged with the ratchet surface to allow axial displacement between said ratchet surface and the coupling arm.

5. The telescopic hitch assembly as claimed in claim 1 wherein said first member is a hollow rigid elongate member.

6. The telescopic hitch assembly as claimed in claim 1 wherein said ratchet surface is axially displaceable relative to said first member within first and second limits.

7. The telescopic hitch assembly as claimed in claim 6 wherein said first and second limits are defined by end walls, respectively of said cavity of said first member.

8. The telescopic hitch assembly as claimed in claim 6 wherein said ratchet surface is biased away from at least one of said first and second limits by biasing means.

9. The telescopic hitch assembly as claimed in claim 6 wherein said ratchet surface is biased away from both said first and second limits by biasing means.

10. The telescopic hitch assembly as claimed in claim 8 wherein said biasing means arc springs.

11. The telescopic hitch assembly as claimed in claim 1 wherein said ratchet surface is fixed relative to said first member.

12. The telescopic hitch assembly as claimed in claim 1 wherein said ratchet surface is formed on the inner surface of a hollow section.

13. The telescopic hitch assembly as claimed in claim 1 wherein said ratchet surface is formed on opposite leg portions of a "U" section.

14. The telescopic hitch assembly as claimed in claim 1 wherein there are two deployable members pivotally connected to the coupling arm, each moveable to and from said operative and inoperative conditions in opposite directions.

15. The telescopic hitch assembly as claimed in claim 1 wherein said coupling arm is substantially elongate and is adapted at one distal end for coupling to said vehicle by a means engagable to a connection point of the vehicle.

16. The telescopic hitch assembly as claimed in claim 15 wherein said means engagable is a female coupling member engagable to a tow ball connection point of the vehicle.

17. The telescopic hitch assembly as claimed in claim 15 wherein at the other distal end of said coupling arm is provided the at least one deployable member.

18. The telescopic hitch assembly as claimed in claim 1 wherein said telescopic engagement of said first member and coupling arm is such that the coupling arm moves in part in and out and from one end of the first member.

19. The telescopic hitch assembly as claimed in claim 1 wherein said at least one deployable member is actuatable between is operative and inoperative conditions by a manually actuable means.

20. The telescopic hitch assembly as claimed in claim 19 wherein said manually actuable means is a lever pivotally connected to said coupling arm about an axis perpendicular to a telescopic axis of said coupling arm, and actuates a push rod coaxial with said coupling arm between two limits of movement defined by positions in which said at least one deployable member is in its operative and inoperative conditions wherein movement from one limit to the other, positively displaces the at least one deployable member to an inoperative condition.

21. The telescopic hitch assembly as claimed in claim 1 wherein said at least one deployable member is biased towards its operative condition by a biasing means.

22. A rotatable hitch assembly for connecting a trailer to a tow vehicle comprising:
 a base member engaged or engagable to the trailer;
 a second member to or from which a coupling arm adapted to connect to the vehicle extends, said second member rotatably engaged about a vertical axis of rotation with said base member;
 at least one means to lock, rotatably carried by one of said base or second member and held in a sliding engagement with the other of said base or second member to secure said base and second member for at least one locking position where the base and second member are in a desired relative angular disposition, wherein said means to lock refrains relative rotation of said base and second member; and
 two pawls acting between said base and second member, each pawl operative in opposite directions of rotation, wherein one pawl when operative prevents relative rotation between the second member and to the base in a first direction and wherein the other pawl when operative prevents relative rotation between the second member and the base in a second direction opposite the first direction.

23. The rotatable hitch assembly as claimed in claim 22 wherein said means to lock acts between two concentrically moving parts of said base and second member.

24. The rotatable hitch assembly as claimed in claim 23 wherein said means to lock is carried by said second member and is displaceable thereto to locate at least in part with a recess of a concentric surface of said base member when in said desired relative angular disposition.

25. The rotatable hitch assembly as claimed in claim 24 wherein said means to lock is a lug displaceable in a radially outward direction to said second member when in an aligned condition with said recess.

26. The rotatable hitch assembly as claimed in claim 22 wherein said desired angular disposition of said base and second members is when the plane through the axis of rotation in the alignment with the point of engagement of said second member is parallel to the direction of alignment of wheels of the trailer.

27. The rotatable hitch assembly as claimed in claim 25 wherein said concentric surface allows the said lug to rotate to a locking position when aligned with said recess.

28. The rotatable hitch assembly as claimed in claim 22 wherein a cam plate is provided which is actually rotatable about said axis of rotation relative to said second member, said cam plate being provided with a cam surface with which a cam follower of said means to lock acts, where upon rotation of the cam plate relative to the said second member, said means to lock is thereby moved at least from its locking condition to an unlocking condition.

29. The rotatable hitch assembly as claimed in claim 22 wherein said means to lock is biased to act in a direction to lock.

30. The rotatable hitch assembly as claimed in claim 29 wherein said biasing of said means to lock is by a spring.

31. The rotatable hitch assembly as claimed in claim 22 wherein said pawls are pivotably rotatable about pivot points on the second member and each pawl extends to locate with an inwardly directed surface of said base, wherein said inwardly directed surface is provided with reliefs which act with said pawls to prevent rotation of said means to lock away from a recess formed on said base member.

32. The rotatable hitch assembly as claimed in claim 22 wherein said pawls are pivotably rotatable to the second member and each extend for engaging with an inwardly directed surface of said base member, wherein said surface is provided with reliefs, wherein at least one of said pawls prevents rotation in the direction away from said desired angular disposition when said at least one of said pawls engages one of said reliefs.

33. The rotatable hitch assembly as claimed in claim 28 wherein said cam plate also has cam surfaces for engagement by cam followers of said pawls, wherein the pawls are rotatably coupled to one of said base and second members, wherein each pawl can rotate relative to said one member for engaging an inner surface of the other of said base and second members, wherein the pawls can upon the rotation of said cam plate be retracted from engagement from said inner surface.

34. The rotatable hitch assembly as claimed in claim 33 wherein said rotation of said cam plate moves said means to lock from its locking condition and also simultaneously moves the pawls from said inner surface.

35. A rotatable hitch assembly for connecting a trailer to a tow vehicle comprising;
   a base member coupleable to the trailer;
   a second member from which a coupling arm coupleable to the vehicle extends, said second member rotatably engaged about a vertical axis of rotation with said base member;
   two pawls coupled to one of said base and second member and engageable with a ratchet surface defined on the other of said base and second member, wherein one pawl when engaged to the ratchet surface prevents relative rotation between the second member and to the base in a first direction and wherein the other pawl when engaged to the ratchet surface prevents relative rotation between the second member and the base in a second direction opposite the first direction; and
   a cam plate having a plurality of cam surfaces, wherein each pawl comprises a cam follower, wherein upon sufficient rotation of the cam plate, a cam follower of one pawl is engaged by at least one of said cam surfaces causing said one pawl to disengage from the ratchet surface.

36. The rotatable hitch assembly for connecting a trailer Lo a tow vehicle comprising:
   a base member coupleable to the trailer;
   a second member from which a coupling arm coupleable to the vehicle extends, said second member rotatably coupled with said base member about a rotation axis;
   a lug carried by one of said base or second member and held in a sliding engagement within an opening in the other of said base or second member to secure the second member relative to the base member at a desired relative angle, wherein the lug refrains relative rotation of said base and second members
   a cam plate rotating about said rotation axis having a cam surface; and
   a cam follower coupled to the lug and riding on the cam surface, wherein when the lug and opening are aligned, the cam surface allows the lug to move into the opening for preventing relative rotation between the second member and the base member, and wherein rotation of the cam plate in one direction causes the cam follower which rides on the cam surface to cause the lug to disengage from the opening permitting relative rotation between the second member and the base.

37. The rotatable hitch assembly as recited in claim 36 further comprising a spring for biasing the lug toward the opening when the lug and opening are aligned.

38. The rotatable hitch assembly as recited in claim 36 wherein rotation of one of said second member and said base causes the cam plate to rotate.

* * * * *